(12) United States Patent
Ruebsamen

(10) Patent No.: US 10,404,492 B2
(45) Date of Patent: Sep. 3, 2019

(54) DEVICE AND METHOD FOR MITIGATING LOWPASS FILTER GROUP DELAY

(71) Applicant: Intel IP Corporation, Santa Clara, CA (US)

(72) Inventor: Michael Ruebsamen, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/760,450

(22) PCT Filed: Aug. 17, 2016

(86) PCT No.: PCT/EP2016/069479
§ 371 (c)(1),
(2) Date: Mar. 15, 2018

(87) PCT Pub. No.: WO2017/045856
PCT Pub. Date: Mar. 23, 2017

(65) Prior Publication Data
US 2018/0262369 A1    Sep. 13, 2018

(30) Foreign Application Priority Data

Sep. 18, 2015 (DE) .......................... 10 2015 115 760

(51) Int. Cl.
*H04L 25/02* (2006.01)
*H04L 25/03* (2006.01)

(52) U.S. Cl.
CPC ...... *H04L 25/0212* (2013.01); *H04L 25/0214* (2013.01); *H04L 25/03012* (2013.01); *H04L 2025/0377* (2013.01)

(58) Field of Classification Search
CPC ............. H04L 25/0212; H04L 25/0214; H04L 25/03012; H04L 2025/0377
See application file for complete search history.

(56) References Cited

U.S. PATENT DOCUMENTS 5,896,306 A     4/1999  Aschwanden
2010/0226416 A1  9/2010  Dent et al.
(Continued)

FOREIGN PATENT DOCUMENTS

EP         1838009 A1    9/2007
WO    WO-2008/012553 A2    1/2008
WO    WO-2008/012553 A3    3/2008

OTHER PUBLICATIONS

European International Patent Office, PCT International Search Report and Written Opinioin issued for PCT/EP2016/069479, 12 pgs., dated Oct. 26, 2016.
(Continued)

*Primary Examiner* — Jaison Joseph
(74) *Attorney, Agent, or Firm* — Schiff Hardin LLP

(57) ABSTRACT

A device for mitigating a first group delay of a lowpass filter configured to lowpass filter a first channel coefficient of a set of channel coefficients with respect to time, includes a prediction filter configured to filter a data sequence derived from a lowpass filtered first channel coefficient to generate a prediction value of the lowpass filtered first channel coefficient; and an adjustment circuitry configured to adjust the prediction filter to generate the prediction value having a second group delay that is less than the first group delay.

24 Claims, 6 Drawing Sheets

(56) References Cited

U.S. PATENT DOCUMENTS

2011/0050489 A1* 3/2011 Maenpa ............... G01S 19/23
                                                    342/357.23
2017/0343660 A1* 11/2017 Wang ................. G01R 31/11

OTHER PUBLICATIONS

Office Action dated Nov. 11, 2018 issued for German Patent Application No. 102015115760.8.

* cited by examiner

DEVICE AND METHOD FOR MITIGATING LOWPASS FILTER GROUP DELAY

FIELD

The disclosure relates to a device and a method for mitigating a lowpass filter group delay and to a prediction circuit. In particular, the disclosure relates to adaptive prediction techniques to mitigate channel estimation errors caused by lowpass filter group delays.

BACKGROUND

Lowpass filters are commonly utilized in channel estimation to suppress high frequency estimation error components. In most wireless communication systems, pilot signals are transmitted to facilitate channel estimation at the receiver. Each pilot symbol provides an estimate of the channel impulse response. The rate of pilot symbols has to be sufficiently high so that variations of the channel impulse response can be tracked even at high speeds. This implies that the rate of pilot symbols by far exceeds the rate of channel variations at lower speeds. It can be assumed that the channel estimation errors are zero-mean and uncorrelated for different pilot symbols. High frequency error components can be effectively suppressed by averaging the channel impulse response estimates from several pilot symbols, i.e. by applying lowpass filtering. However, this lowpass filter introduces a group delay, which results in substantial systematic channel estimation errors. FIG. 1 illustrates the time response of an exemplary channel coefficient 104 and the lowpass filtered channel coefficient 102. 104 denotes an exemplary realization of h(k), 102 denotes an exemplary realization of $\bar{h}(k)$ and k stands for the pilot symbol index.

There is a need to mitigate systematic channel estimation errors due to group delay of lowpass filtering.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
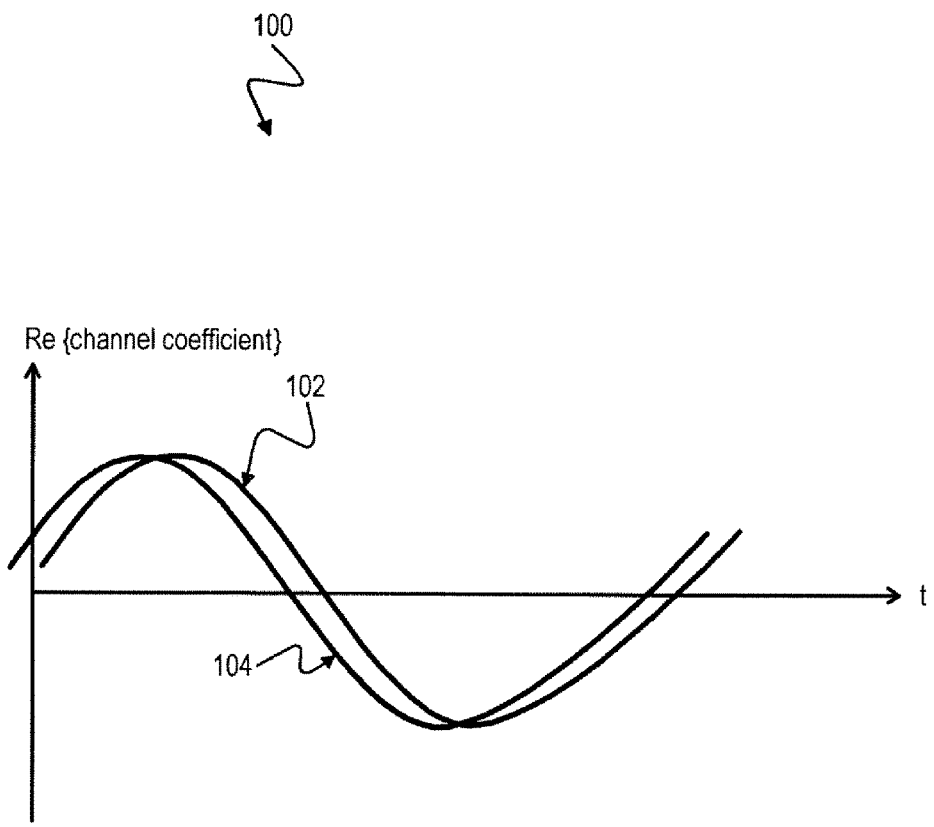
FIG. 1 is a time diagram illustrating an exemplary time characteristic of a channel coefficient 104 and a channel coefficient filtered by a conventional lowpass filter 102.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

In addition, while a particular feature or aspect of an embodiment may be disclosed with respect to only one of several implementations, such feature or aspect may be combined with one or more other features or aspects of the other implementations as may be desired and advantageous for any given or particular application. Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal.

The devices and methods described herein may be used for various wireless communication networks such as Code Division Multiple Access (CDMA), Time Division Multiple Access (TDMA) and Frequency Division Multiple Access (FDMA) networks. The terms "network" and "system" are often used interchangeably. A CDMA network may implement a radio technology such as Universal Terrestrial Radio Access (UTRA), cdma2000, etc. UTRA includes Wideband-CDMA (W-CDMA) and other CDMA variants. Cdma2000 covers IS-2000, IS-95, and IS-856 standards. A TDMA network may implement a radio technology such as Global System for Mobile Communications (GSM) and derivatives thereof such as e.g. Enhanced Data Rate for GSM Evolution (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS).

The methods and devices described herein may be implemented in wireless communication networks, for example communication networks based on mobile communication standards such as UMTS or LTE, in particular LTE-A and/or OFDM. The methods and devices described below may be implemented in mobile devices (or mobile stations or User Equipments (UE)), in particular in radio receivers of such mobile devices. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices and methods described herein may be applied in Multiple-Input Multiple-Output (MIMO) systems. Multiple-Input Multiple-Output (MIMO) wireless communication systems may employ multiple antennas at the transmitter and at the receiver to increase system capacity and to achieve better quality of service.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

Figure 2:
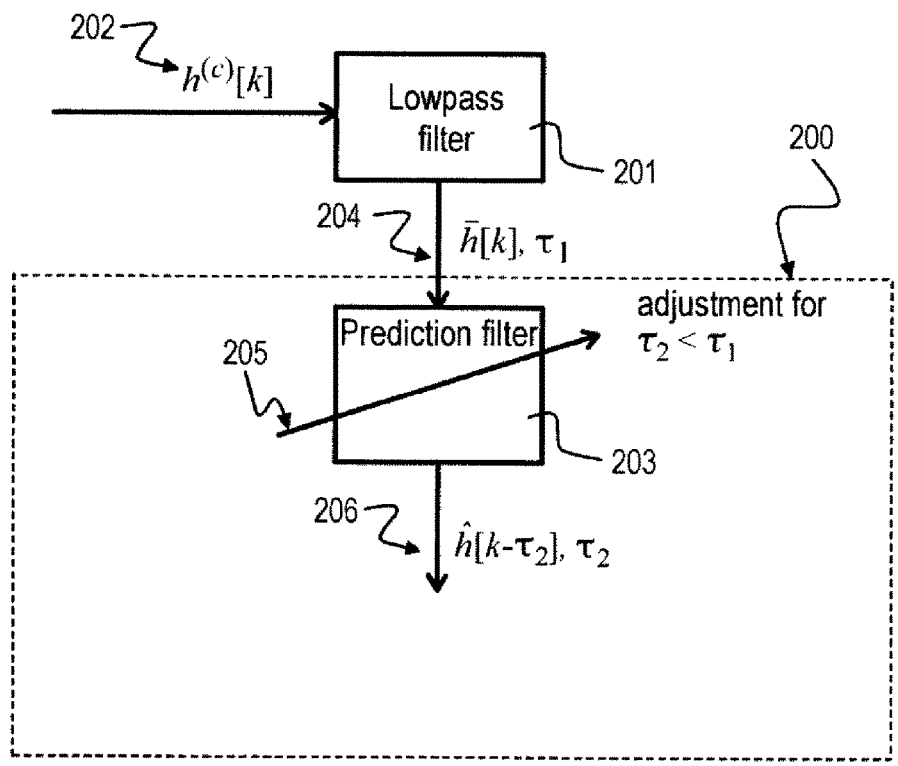
FIG. 2 is a block diagram illustrating a device 200 for mitigating a lowpass filter group delay according to the disclosure.

FIG. 2 is a block diagram illustrating a device 200 for mitigating a lowpass filter group delay according to the disclosure.

The device 200 mitigates a first group delay $\tau_1$ of a lowpass filter that lowpass-filters a first channel coefficient of a set of channel coefficients with respect to time. The device 200 includes a prediction filter 203 and an adjustment circuitry 205. The prediction filter 203 filters a data sequence x[k] derived from the lowpass filtered first channel coefficient $\bar{h}[k]$, 204 to generate a prediction value $\hat{h}[k-\tau_2]$, 206 of the lowpass filtered first channel coefficient $\bar{h}[k]$, 204. The prediction filter 203 is adjusted to generate the prediction value $\hat{h}[k-\tau_2]$, 206 having a second group delay $\tau_2$ that is less than the first group delay $\tau_1$ of the lowpass filtered first channel coefficient $\bar{h}[k]$, 204. In the following, the second group delay $\tau_2$ corresponds to the variable $d_a$ that is used below. Note that the first group delay corresponds to the variable $\tau(0)$ as described below.

By using a prediction filter 203 as described above, the lowpass filter group delay can be compensated. The prediction filter may operate on the downsampled lowpass filter output. The downsampling may be required for the efficient implementation of the prediction filter 203. The above-described scheme reduces systematic channel estimation errors, resulting in substantial throughput gains in particular in high signal-to-noise ratio (SNR) scenarios.

A specific embodiment of the device 200 is described below with respect to FIG. 3.

Figure 3:
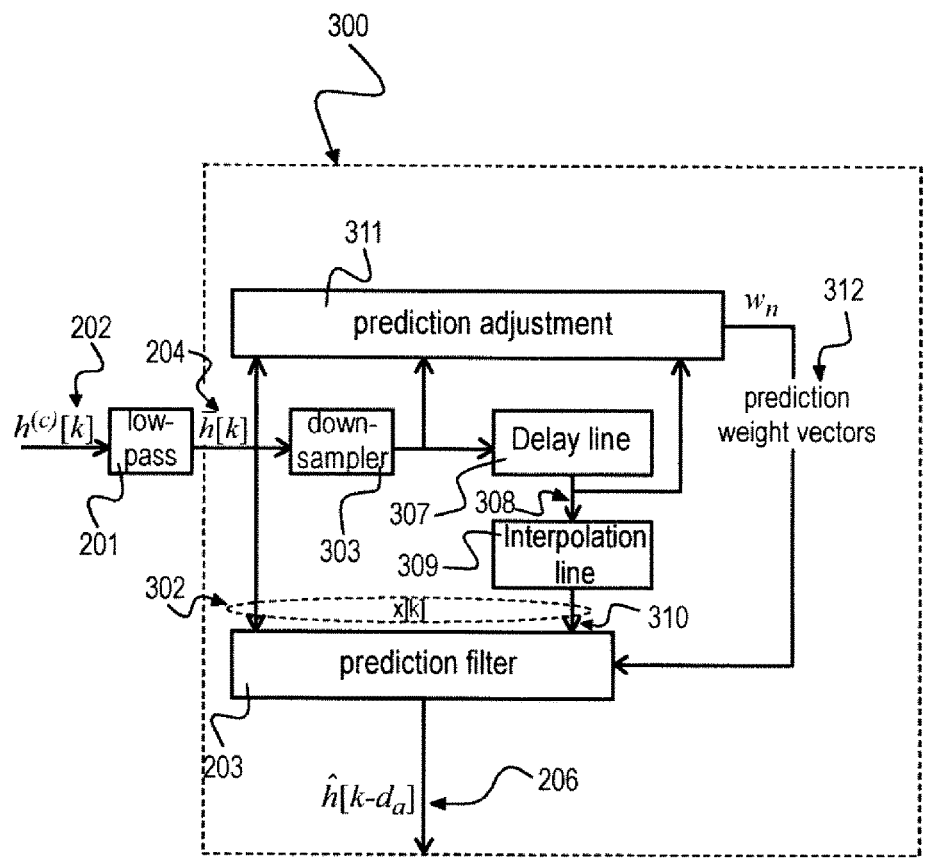
FIG. 3 is a block diagram illustrating a device 300 for mitigating a lowpass filter group delay according to the disclosure.

FIG. 3 is a block diagram illustrating a device 300 for mitigating a lowpass filter group delay according to the disclosure.

The device 300 includes a a prediction filter 203 and an adjustment circuitry 311. A lowpass filter 201 (not part of the device 300) lowpass filters a first channel coefficient $h^{(c)}[k]$, 202 of a set of channel coefficients with respect to time. The lowpass filtered first channel coefficient $\bar{h}[k]$, 204 has a first group delay $\tau_1$. The prediction filter 203 is coupled to the lowpass filter 201. The prediction filter 203 filters a data sequence x[k] derived from the lowpass filtered first channel coefficient $\bar{h}[k]$, 204 to generate a prediction value $\hat{h}[k-\tau_2]$, 206 of the lowpass filtered first channel coefficient $\bar{h}[k]$, 204. The prediction filter 203 is adjusted to generate the prediction value $\hat{h}[k-\tau_2]$, 206 having a second group delay $\tau_2$ that is less than the first group delay $\tau_1$ of the lowpass filtered first channel coefficient $\bar{h}[k]$, 204.

The device 300 includes the adjustment circuitry 311 that may adjust the prediction filter 203 based on a prediction filter algorithm.

The data sequence x[k], 302 may include the lowpass filtered first channel coefficient $\bar{h}[k]$, 204.

The device 300 may further include a downsampler 303 coupled to the lowpass filter 201. The downsampler 303 may downsample the lowpass filtered first channel coefficient $\bar{h}[k]$, 204 to generate a time series of downsampled lowpass filtered first channel coefficients. The data sequence x[k] may include values derived from the downsampled lowpass filtered first channel coefficient $\bar{h}[k]$, 204.

The device 300 may further include a delay line 307 coupled to the downsampler 303. The delay line 307 may generate a first time pattern series 308 by delaying the downsampled lowpass filtered first channel coefficient with respect to time. The data sequence x[k], 302 may include values derived from the first time pattern series 308.

The device 300 may further include an interpolation line 309 coupled to the delay line 307. The interpolation line 309 may generate a second time pattern series 310 by interpolating values of the first time pattern series 308. The data sequence x[k] may include the second time pattern series 310.

The interpolation line 309 may generate the second time pattern series 310 at time samples between time samples of the first time pattern series 308.

The interpolation line 309 may interpolate between at least two contiguous time samples of the first time pattern series 308. Alternatively, the interpolation line 309 may interpolate between multiple time samples of the first time pattern series 308.

The adjustment circuitry 311 may adjust the prediction filter 203 based on lowpass filtered and delayed samples without interpolation. The adjustment circuitry 311 may adjust the prediction filter 203 at time samples of the second time pattern series 310.

The prediction filter 203 may generate a compensation for a predetermined group delay of the lowpass filter 201.

The device 300 may include a second prediction filter (not depicted in FIG. 3), e.g. for mitigating a lowpass filter group delay of a second channel coefficient. The second lowpass filter may lowpass filter a second channel coefficient $h_2^{(c)}[k]$ of the set of channel coefficients with respect to time. The lowpass filtered second channel coefficient $\bar{h}_2[k]$ may have a third group delay $\tau_3$. The second prediction filter may be coupled to the second lowpass filter. The second prediction filter may filter a second data sequence $x_2[k]$ derived from the lowpass filtered second channel coefficient $\bar{h}_2[k]$ to generate a second prediction value $\hat{h}_2[k-\tau_4]$ of the lowpass filtered second channel coefficient $\bar{h}_2[k]$. The second prediction filter may be adjusted to generate the second prediction value $\hat{h}_2[k-\tau_4]$ having a fourth group delay $\tau_4$ that is less than the third group delay $\tau_3$ of the lowpass filtered second channel coefficient $\bar{h}_2[k]$. The third group delay may be set equal to the first group delay, i.e., $\tau_3=\tau_1=\tau(0)$. Moreover, the fourth group delay may be set equal to the second group delay, i.e., $\tau_4=\tau_2=d_a$.

The prediction filter 203 and the second prediction filter may independently filter the first data sequence and the second data sequence, respectively.

Figure 4:
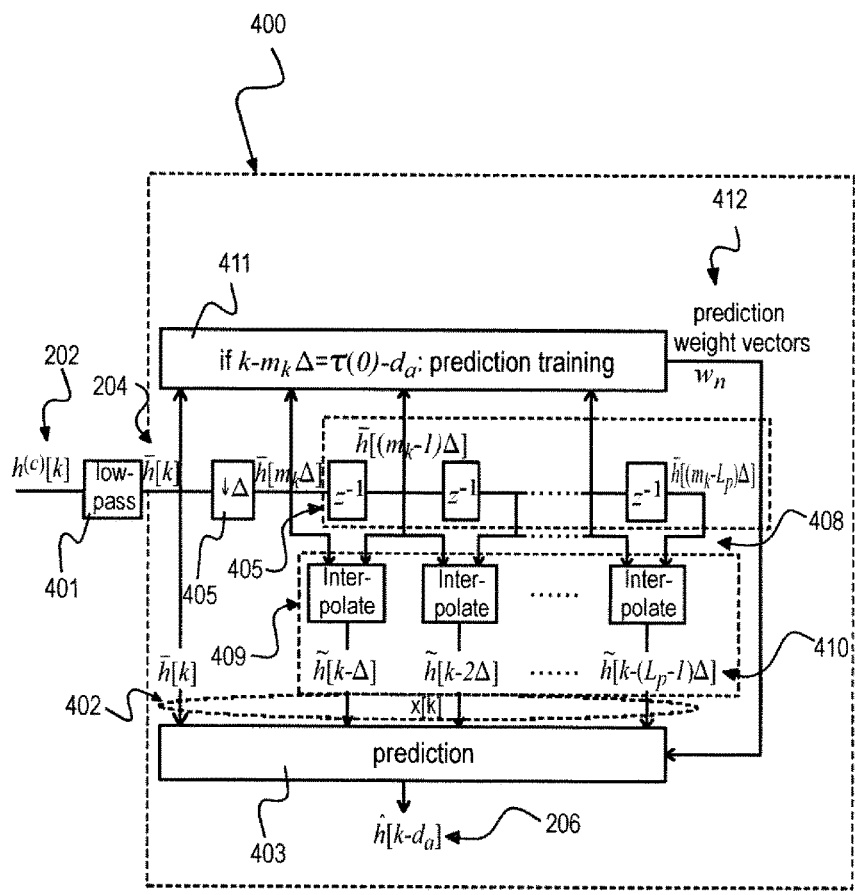
FIG. 4 is a block diagram illustrating a prediction circuit 400 according to the disclosure.

FIG. 4 is a block diagram illustrating a prediction circuit 400 according to the disclosure. The prediction circuit 400 includes a downsampling circuit 405, e.g. according to the downsampler 303 described above with respect to FIG. 3, a delay line circuit 407, e.g. according to the delay line 307 described above with respect to FIG. 3, an interpolation line circuit 409, e.g. according to the interpolation line 309 described above with respect to FIG. 3, and a prediction filter circuit 403, e.g. according to the prediction filter 203 described above with respect to FIGS. 2 and 3.

The lowpass filter circuit 401 (not part of the prediction circuit 400) lowpass filters a first channel coefficient $h^{(c)}[k]$, 202 with respect to time. The downsampling circuit 405 downsamples the lowpass filtered first channel coefficient $\bar{h}[k]$, 204. The delay line circuit 407 generates a first time pattern series 408 by delaying the downsampled lowpass filtered first channel coefficient with respect to time. The interpolation line circuit 409 generates a second time pattern series 410 by interpolating values of the first time pattern series 408. The prediction filter circuit 403 filters a data sequence x[k], 402 derived from the lowpass filtered first channel coefficient $\bar{h}[k]$, 204 and the second time pattern series 410 to provide a prediction value $\hat{h}[k-\tau_2]$, which is a time-aligned estimate of the first channel coefficient h[k-$\tau_2$].

The prediction filter circuit 403 may generate the prediction value $\hat{h}[k-\tau_2]$, 206 having a group delay smaller than a group delay of the lowpass filter circuit 401.

The lowpass filter circuit 401 may generate the lowpass filtered first channel coefficient $\bar{h}[k]$, 204 as a first value of the data sequence x[k], 402. The interpolation line circuit 409 may generate the second time pattern series 410 as further values of the data sequence x[k], 402.

The prediction circuit 400 may further include an adjustment circuit 411 for adjusting the prediction filter circuit 403 based on a prediction filter algorithm, e.g. an RLS algorithm.

The delay line circuit 407 may include a memory for storing the first time pattern series 408. A length of the first time pattern series 408 may be for example one of the following values: 1, 2, 3, 4, 5.

FIG. 4 depicts the disclosed channel estimator architecture. The estimate of the channel impulse response from the kth pilot symbol can be expressed as a vector $$h^{(c)}[k]=h[k]+v[k]\in \mathbb{C}^{L_c\times 1}$$

where h[k] is the actual channel impulse response, v[k] is the estimation error vector, $L_c$ is the length of the impulse response, and $\mathbb{C}$ denotes the set of complex numbers. Note that the non-bold representations h[k], $h^{(c)}[k]$, $\bar{h}[k]$ and $\hat{h}[k-\tau_2]$ refer to the first channel coefficient, whereas the bold representations denote vectors.

The estimation error vectors v[k] are assumed to be zero-mean and mutually uncorrelated. In contrast, the actual channel impulse response typically changes slowly with time, in particular for low speeds. Thus, channel estimation errors can be reduced significantly by averaging over consecutive estimates $h^{(c)}[k]$.

The so-obtained lowpass filtered impulse response vectors are denoted by $\bar{h}[k]$. For example, if an exponential time window is used for averaging, one can write $$\bar{h}[k]=\alpha h^{(c)}[k]+(1-\alpha)\bar{h}[k-1]\in \mathbb{C}^{L_c\times 1}$$

where $\alpha$ is the lowpass filter coefficient. The frequency response of this lowpass filter can be expressed as $$\bar{H}(f) = \frac{\alpha}{1-(1-\alpha)e^{-j2\pi f}}$$

where f∈[−1/2, 1/2] is the normalized (with respect to the sampling rate) frequency.

The group delay of a linear time invariant filter with frequency response $\bar{H}(f)$ may be given by $$\tau(f) = -\frac{1}{2\pi}\frac{\partial}{\partial f}\{\arg[\bar{H}(f)]\}.$$

For the exponential time window, one obtains:

$$\tau(f) = \frac{-(1-\alpha)^2+(1-\alpha)\cos(2\pi f)}{(1-\alpha)^2-2(1-\alpha)\cos(2\pi f)+1}.$$

Clearly, the group delay depends on the frequency, but if the components of h[k] are sufficiently narrowband, one approximately has $$\tau(f)\approx\tau(0)$$

over their frequency support.

For this reason, the prediction filter may be designed to compensate a delay of $\tau(0)-d_a$, where $d_a$ is a desired or acceptable delay.

The lowpass filtered channel impulse response estimates are downsampled by a factor $\Delta$, which takes large values in particular for low speeds. For example, a typical downsampling factor for low speed scenarios is about 50. The downsampling reduces the memory and computational complexity requirements of prediction and the associated training algorithm by at least a factor $\Delta$. Moreover, downsampling may lead to a reduced number of prediction weights, thus better convergence rates. The output of the downsampling block at the kth time instant is $\bar{h}[m_k\Delta]$, where $m_k$ is the smallest integer that is less than or equal to k/$\Delta$, that is $$m_k = \left\lfloor\frac{k}{\Delta}\right\rfloor.$$

The downsampling is followed by a sequence of $L_p$ delays, where $L_p$ is the prediction order. At the kth time instant, the delay line stores the lowpass filtered channel impulse response estimates $$\bar{h}[(m_k-1)\Delta],\bar{h}[(m_k-2)\Delta],\ldots \bar{h}[(m_k-L_p)\Delta]$$

which may be used for channel prediction and prediction training as explained in the following.

The prediction may be applied independently for each tap of the channel impulse response, using different prediction weight vectors for different taps. The nth tap of the channel impulse response may be predicted as $$\hat{h}_n[k-d_a]=w_n^H x_n[k]$$

where $w_n$ is the $L_p\times 1$ prediction weight vector, $$x_n[k]=(\tilde{h}_n[k]\tilde{h}_n[k-\Delta]\tilde{h}n[k-2\Delta]\ldots \tilde{h}_n[k-(L_p-1)\Delta])^T\in \mathbb{C}^{L_p\times 1}$$

contains information about the current and previous values of the nth component of the lowpass filtered channel impulse response, and $(\cdot)^T$ and $(\cdot)^H$ are the transpose and Hermitian transpose operators, respectively.

The entries $$\tilde{h}_n[k-\Delta],\tilde{h}_n[k-2\Delta],\ldots \tilde{h}_n[k-(L_p-1)\Delta]$$

are estimates of $$\bar{h}_n[k-\Delta],\bar{h}_n[k-2\Delta],\ldots \bar{h}_n[k-(L_p-1)\Delta]$$

and these estimates can be obtained from $$\bar{h}_n[m_k\Delta],\bar{h}_n[(m_k-1)\Delta],\ldots \bar{h}_n[(m_k-(L_p-1)\Delta]$$

by means of interpolation.

Hence, $\tilde{h}_n[k-q\Delta]$ can differ from $\bar{h}_n[k-q\Delta]$ due to interpolation errors. In FIG. 4, linear interpolation may be assumed, so only two inputs may be used for each interpolated value. Other more sophisticated interpolation techniques may be employed as well.

Taking into account the lowpass filter group delay, $x_n[k]$ contains estimates of $$h_n(k-\tau(0)),h_n(k-\Delta-\tau(0)),\ldots,h_n(k-(L_p-1)\Delta-\tau(0)).$$

These estimates may be used to predict $h_n(k-d_a)$. The same time pattern should be used for prediction training. For this reason, the prediction weights are updated when $k-m_k\Delta=\tau(0)-d_a$ using $$\bar{h}_n[k=m_k\Delta+\tau(0)-d_a], \bar{h}_n[m_k\Delta], \bar{h}n[(m_k-1)\Delta], \ldots, \bar{h}_n[(m_k-L_p+1)\Delta]$$

as new training data.

Hence, the predictor weights may be updated every pilot symbols. For the mth update of the predictor weights and for the nth component of the channel impulse response, the following may be defined:

$$z_n[m]=\bar{h}_n[m\Delta+\tau(0)-d_a]$$

and $$y_n[m]=(\bar{h}_n[m\Delta]\bar{h}_n[(m-1)\Delta]\ldots\bar{h}_n[(m-L_p+1)\Delta])^T\in\mathbb{C}^{L_p\times 1}$$

There are numerous techniques in the literature for the adaptive computation of prediction weights. Many of these techniques are based on recursive least-squares (RLS) due to the fast convergence rate and low computational complexity. At the mth update of the prediction weights and for the nth tap, the RLS algorithm may compute the weights that minimize the exemplary cost function $$\mathcal{L}_{m,n}(w) = \sum_{q=0}^{m} \zeta^{m-q}|z_n[q] - w^H y_n[q]|^2$$

where $\zeta<1$ is a forgetting factor.

In the above description, it is assumed that the downsampling factor $\Delta$ is greater than $\tau(0)-d_a$, but it is straightforward to modify the disclosed concept for smaller downsampling factors.

The above-described prediction circuit 400 significantly improves the channel estimation accuracy resulting in substantial throughput key performance indicator (KPI) gains.

Figure 5:
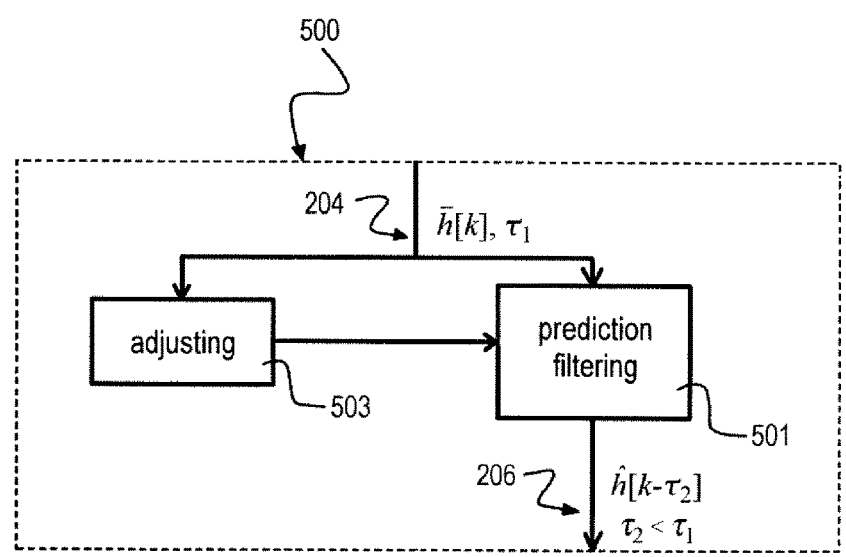
FIG. 5 is a schematic diagram illustrating a method 500 for mitigating a lowpass filter group delay according to the disclosure.

FIG. 5 is a schematic diagram illustrating a method 500 for mitigating a lowpass filter group delay according to the disclosure. The lowpass filter group delay may result from lowpass filtering a first channel coefficient, e.g. $h^{(o)}[k]$ with respect to time, the lowpass filtered first channel coefficient, e.g. $\bar{h}[k]$ includes a first group delay $\tau_1$.

The method 500 includes: prediction filtering 501 a data sequence x[k], 302, 402 derived from the lowpass filtered first channel coefficient $\bar{h}[k]$, 204 to provide a prediction value $\hat{h}[k-\tau_2]$, 206 of the lowpass filtered first channel coefficient $\bar{h}[k]$, 204. The method 500 further includes adjusting 503 the prediction filtering 501 to generate the prediction value $\hat{h}[k-\tau_2]$, 206 including a second group delay $\tau_2$ that is less than the first group delay $\tau_1$. The prediction filtering 501 may be according to the filtering with the prediction filter 203 as described above with respect to FIGS. 2 and 3 or according to the filtering with the prediction filter circuit 403 as described above with respect to FIG. 4.

The method 500 may further include adjusting the prediction filtering 501 based on a prediction filter algorithm.

The method 500 may further include downsampling the lowpass filtered first channel coefficient $\bar{h}[k]$, 204 to generate a time series of downsampled lowpass filtered first channel coefficients, wherein the data sequence x[k], 302, 402 comprises values derived from the downsampled lowpass filtered first channel coefficient, e.g. according to the downsampling described above with respect to FIGS. 3 and 4.

The method 500 may further include delaying the downsampled lowpass filtered first channel coefficient with respect to time to generate a first time pattern series 308, 408, wherein the data sequence x[k], 302, 402 comprises values derived from the first time pattern series 308, 408, e.g. according to the delaying described above with respect to FIGS. 3 and 4.

The method 500 may further include interpolating values of the first time pattern series 308, 408 to generate a second time pattern series 310, 410, wherein the data sequence x[k], 302, 402 comprises the second time pattern series 310, 410, e.g. according to the interpolating described above with respect to FIGS. 3 and 4.

In one example, the method 500 may be represented by the following processing blocks. In a first processing block an averaging filter may be applied to suppress high-frequency estimation error components. In a second processing block, the averaging filter output may be downsampled to reduce the computational complexity and memory requirements of the subsequent processing block. In a third processing block, a prediction filter may be applied to mitigate estimation errors induced by the group delay of the averaging filter.

Figure 6:
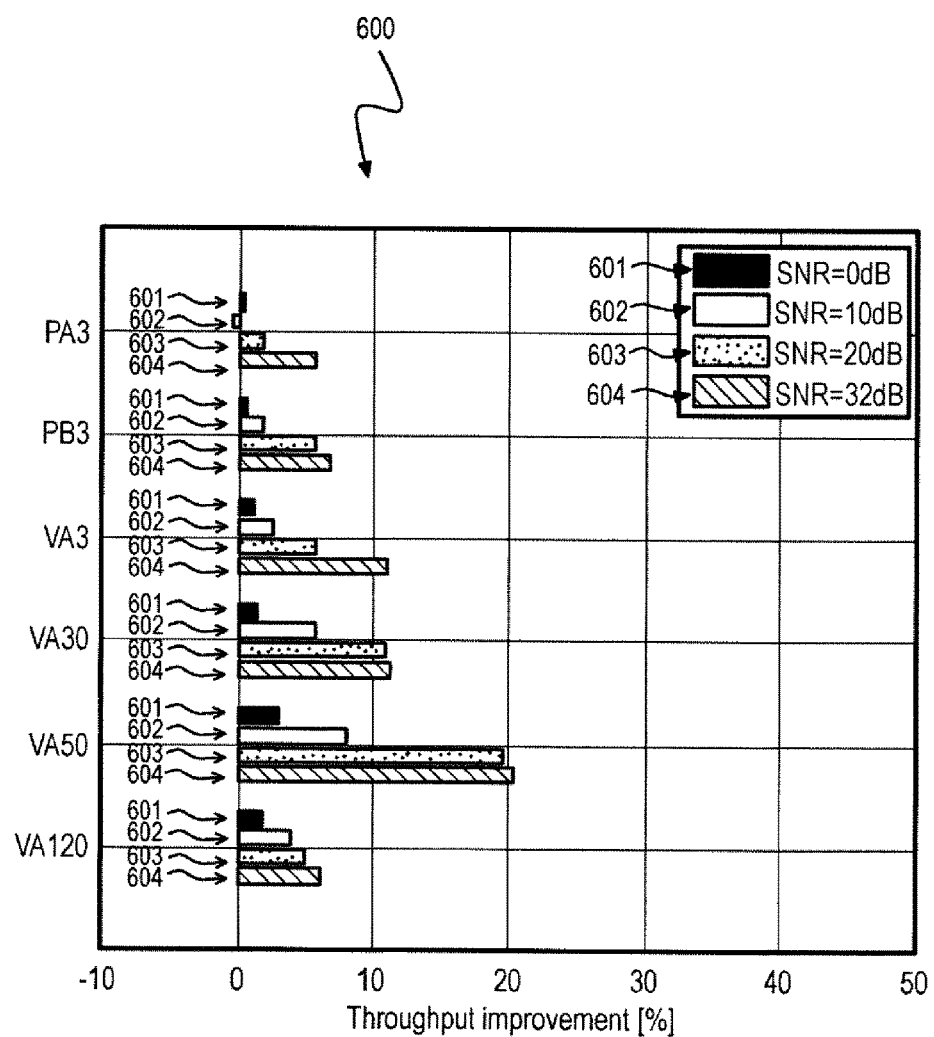
FIG. 6 is a performance diagram illustrating throughput performance gain when using a method 500 for mitigating a lowpass filter group delay according to the disclosure.

FIG. 6 is a performance diagram illustrating throughput performance gain when using a method 500 for mitigating a lowpass filter group delay according to the disclosure.

FIG. 6 depicts throughput performance gains due to the channel predictor for one receive antenna and different channel scenarios (PA3, PB3, VA3, VA30, VA50 and VA120). First bars 601 illustrate an SNR of 0 dB, second bars 602 illustrate an SNR of 10 dB, third bars 603 illustrate an SNR of 20 dB and fourth bars 604 illustrate an SNR of 30 dB.

It can be seen from the figure that the disclosed prediction technique provides significant throughput improvements in particular in the high SNR regime.

Applying the prediction technique according to the disclosure provides advantages as described in the following. Averaging the channel impulse response estimates of many pilot symbols provides a good suppression of temporally white estimation errors. The prediction step removes the delay and corresponding estimation errors introduced by the averaging filter.

In the following, a comparison to an alternative technique is described. In this alternative technique the received waveforms are buffered for the time period of the lowpass filter group delay so that the averaged channel estimates and all derived parameters, in particular equalizer coefficients, can be applied to the time-aligned samples of the received waveforms. When applying devices and methods according to the disclosure using prediction, the buffer to correct for the lowpass filter group delay is not required. The received waveforms can be buffered so that the averaged channel estimates and all derived parameters, in particular equalizer coefficients, can be applied to the time-aligned samples of the received waveforms. The disclosed prediction technique requires to store the received waveforms only for the time that is needed to compute equalizer coefficients, for example one third of a TTI in 3G HSDPA. Thus, no huge memory is required to store the received waveforms. Furthermore, there is no latency increase in the overall system response, which is compatible with 3G HSDPA, in which the group delay of the channel averaging filter is up to two TTIs. Storing the received waveform samples only for the time that is needed to compute equalizer coefficients reduces memory requirements. Moreover, the HSDPA standard requires that the total receiver processing (channel estimation, equalization, channel decoding) is completed within two TTIs. This requirement is satisfied if channel estimation and equalization lead to a delay of about one third of a TTI. Consequently, the disclosed prediction technique results in an approximately six times smaller buffer size. This leads to a substantially reduced die size and manufacturing cost for the receiver.

In the following, a comparison to an alternative technique, the so called Wiener filtering is described. Lowpass filters with small group delay can be designed. For example, Wiener filter coefficients can be computed in order to estimate the current channel impulse response using several or all previous pilot symbols. For low speeds, the Wiener filter is typically about 50 times longer than the proposed prediction filter. That means, the computational complexity and memory requirements of the disclosed prediction technique are at least 50 times smaller as compared to the Wiener filter. In addition, the convergence rate of the disclosed prediction technique is substantially faster than that of the Wiener filter due to the reduced number of filter coefficients.

In the following, a comparison to an alternative technique, the so called state-space approach is described. A state-space approach such as a Kalman filter with inherent prediction step can be employed. This filter is known to be optimum if the received channel waveforms follow a state transition model with known model parameters such as measurement and process noise powers. However, the Kalman filter performance is sensitive to model errors. For channel estimation, it is difficult to accurately determine the measurement and process noise powers. As a result, Kalman filter based channel estimates are far from optimum in practice. The disclosed prediction technique does not use a state-space model and hence does not require to estimate model parameters. As a consequence, it is simpler in implementation and independent of model assumptions. Simulations show that the disclosed prediction technique achieves similar channel estimation accuracy as the ideal Kalman filter.

The techniques according to the disclosure may be applied to a set of channel coefficients as described above. These techniques may also be applied to a reduced set of channel coefficients that may be derived from the original set of channel coefficients, e.g. by applying Model Order Reduction techniques. The original set of channel coefficients or low-pass filtered channel coefficients, respectively, may be high, for example of dimension 50 or higher. Applying model order reduction to the original set of channel coefficients or low-pass filtered channel coefficients, respectively, may reduce the dimension of the set of channel coefficients or low-pass filtered channel coefficients, respectively, for example to a dimension around 10 or even below and therefore significantly reduce the computational complexity. Model Order Reduction lowers the computational complexity of the original model, i.e. the original set of channel coefficients or low-pass filtered channel coefficients, respectively, by a reduction of the model's associated state space dimension or degrees of freedom to obtain an approximation to the original model.

EXAMPLES

The following examples pertain to further embodiments. Example 1 is a device for mitigating a first group delay of a lowpass filter configured to lowpass filter a first channel coefficient of a set of channel coefficients with respect to time, the device comprising: a prediction filter configured to filter a data sequence derived from the lowpass filtered first channel coefficient to generate a prediction value of the lowpass filtered first channel coefficient; and an adjustment circuitry configured to adjust the prediction filter to generate the prediction value comprising a second group delay that is less than the first group delay.

In Example 2, the subject matter of Example 1 can optionally include that the adjustment circuitry is configured to adjust the prediction filter based on a prediction filter algorithm.

In Example 3, the subject matter of any one of Examples 1-2 can optionally include that the data sequence comprises the lowpass filtered first channel coefficient.

In Example 4, the subject matter of Example 3 can optionally include a downsampler coupled to the lowpass filter and configured to downsample the lowpass filtered first channel coefficient to generate a time series of downsampled lowpass filtered first channel coefficients, and that the data sequence comprises values derived from the downsampled lowpass filtered first channel coefficient.

In Example 5, the subject matter of Example 4 can optionally include a delay line coupled to the downsampler and configured to generate a first time pattern series by delaying the downsampled lowpass filtered first channel coefficient with respect to time, and that the data sequence comprises values derived from the first time pattern series.

In Example 6, the subject matter of Example 5 can optionally include an interpolation line coupled to the delay line and configured to generate a second time pattern series by interpolating values of the first time pattern series, and that the data sequence comprises the second time pattern series.

In Example 7, the subject matter of Example 6 can optionally include that the interpolation line is configured to generate the second time pattern series at time samples between time samples of the first time pattern series.

In Example 8, the subject matter of any one of Examples 6-7 can optionally include that the interpolation line is configured to interpolate between at least two contiguous time samples of the first time pattern series.

In Example 9, the subject matter of any one of Examples 6-7 can optionally include that the interpolation line is configured to interpolate between multiple time samples of the first time pattern series.

In Example 10, the subject matter of any one of Examples 6-9 can optionally include that the adjustment circuitry is configured to adjust the prediction filter based on lowpass filtered and delayed samples.

In Example 11, the subject matter of any one of Examples 6-10 can optionally include that the adjustment circuitry is configured to adjust the prediction filter at time samples of the second time pattern series.

In Example 12, the subject matter of any one of Examples 1-11 can optionally include that the prediction filter is configured to generate a compensation for a predetermined group delay of the lowpass filter.

In Example 13, the subject matter of any one of Examples 1-12 can optionally include a second prediction filter configured to filter a second data sequence derived from a lowpass filtered second channel coefficient to generate a second prediction value of the lowpass filtered second channel coefficient; and a second adjustment circuitry configured to adjust the second prediction filter to generate the second prediction value comprising a fourth group delay smaller than a third group delay of the lowpass filtered second channel coefficient.

In Example 14, the subject matter of Example 13 can optionally include that the prediction filter and the second prediction filter are configured to independently filter the first data sequence and the second data sequence, respectively.

Example 15 is a prediction circuit, comprising: a downsampling circuit configured to downsample a lowpass filtered first channel coefficient; a delay line circuit configured to generate a first time pattern series by delaying the downsampled lowpass filtered first channel coefficient with respect to time; an interpolation line circuit configured to generate a second time pattern series by interpolating values of the first time pattern series; and a prediction filter circuit configured to filter a data sequence derived from the lowpass filtered first channel coefficient and the second time pattern series to provide a prediction value of the lowpass filtered first channel coefficient.

In Example 16, the subject matter of Example 15 can optionally include that the prediction filter circuit is configured to generate the prediction value comprising a group delay smaller than a group delay of a lowpass filter circuit providing the lowpass filtered first channel coefficient.

In Example 17, the subject matter of Example 16 can optionally include that the lowpass filter circuit generates the lowpass filtered first channel coefficient as a first value of the data sequence, and that the interpolation line circuit is configured to generate the second time pattern series as further values of the data sequence.

In Example 18, the subject matter of any one of Examples 15-17 can optionally include an adjustment circuit configured to adjust the prediction filter circuit based on a prediction filter algorithm.

In Example 19, the subject matter of any one of Examples 15-18 can optionally include that the delay line circuit comprises a memory configured to store the first time pattern series.

In Example 20, the subject matter of any one of Examples 15-19 can optionally include that a length of the first time pattern series is one of the following: 1, 2, 3, 4, 5.

Example 21 is a method for mitigating a lowpass filter group delay, the lowpass filter group delay resulting from lowpass filtering a first channel coefficient with respect to time, the lowpass filtered first channel coefficient comprising a first group delay, the method comprising: prediction filtering a data sequence derived from the lowpass filtered first channel coefficient to provide a prediction value of the lowpass filtered first channel coefficient; and adjusting the prediction filtering to generate the prediction value comprising a second group delay that is less than the first group delay.

In Example 22, the subject matter of Example 21 can optionally include adjusting the prediction filtering based on a prediction filter algorithm.

In Example 23, the subject matter of any one of Examples 21-22 can optionally include downsampling the lowpass filtered first channel coefficient to generate a time series of downsampled lowpass filtered first channel coefficients, wherein the data sequence comprises values derived from the downsampled lowpass filtered first channel coefficient.

In Example 24, the subject matter of Example 23 can optionally include delaying the downsampled lowpass filtered first channel coefficient with respect to time to generate a first time pattern series, wherein the data sequence comprises values derived from the first time pattern series.

In Example 25, the subject matter of Example 24 can optionally include interpolating values of the first time pattern series to generate a second time pattern series, wherein the data sequence comprises the second time pattern series.

Example 26 is a computer readable medium on which computer instructions are stored which when executed by a computer, cause the computer to perform the method of one of Examples 21 to 25.

Example 27 is a device, comprising: means for lowpass filtering a first channel coefficient with respect to time, the lowpass filtered first channel coefficient comprising a first group delay; means for prediction filtering a data sequence derived from the lowpass filtered first channel coefficient to provide a prediction value of the lowpass filtered first channel coefficient; and means for adjusting the means for prediction filtering to generate the prediction value comprising a second group delay that is less than the first group delay.

In Example 28, the subject matter of Example 27 can optionally include that the means for adjusting the means for prediction filtering is configured to perform the adjusting based on a prediction filter algorithm.

In Example 29, the subject matter of any one of Examples 27-28 can optionally include means for downsampling the lowpass filtered first channel coefficient to generate a time series of downsampled lowpass filtered first channel coefficients, wherein the data sequence comprises values derived from the downsampled lowpass filtered first channel coefficient.

In Example 30, the subject matter of Example 29 can optionally include means for delaying the downsampled lowpass filtered first channel coefficient with respect to time to generate a first time pattern series, wherein the data sequence comprises values derived from the first time pattern series.

In Example 31, the subject matter of Example 30 can optionally include means for interpolating values of the first time pattern series to generate a second time pattern series, wherein the data sequence comprises the second time pattern series.

Example 32 is a prediction system, comprising: a lowpass filter subsystem configured to lowpass filter a first channel coefficient with respect to time; a downsampling subsystem configured to downsample the lowpass filtered first channel coefficient; a delay line subsystem configured to generate a first time pattern series by delaying the downsampled lowpass filtered first channel coefficient with respect to time; an interpolation line subsystem configured to generate a second time pattern series by interpolating values of the first time pattern series; and a prediction filter subsystem configured to filter a data sequence derived from the lowpass filtered first channel coefficient and the second time pattern series to provide a prediction value of the lowpass filtered first channel coefficient.

In Example 33, the subject matter of Example 32 can optionally include that the prediction filter subsystem is configured to generate the prediction value comprising a group delay smaller than a group delay of the lowpass filter circuit.

In Example 34, the subject matter of any one of Examples 32-33 can optionally include that the lowpass filter subsystem is configured to generate the lowpass filtered first channel coefficient as a first value of the data sequence, and that the interpolation line subsystem is configured to generate the second time pattern series as further values of the data sequence.

In Example 35, the subject matter of any one of Examples 32-34 can optionally include an adjustment subsystem configured to adjust the prediction filter subsystem based on a prediction filter algorithm.

In Example 36, the subject matter of any one of Examples 32-35 can optionally include that the delay line subsystem comprises a memory configured to store the first time pattern series.

In Example 37, the subject matter of any one of Examples 32-36 can optionally include that a length of the first time pattern series is one of the following: 1, 2, 3, 4, 5.

In Example 38, the subject matter of any one of Examples 32-37 can optionally include that the system is an on-chip system.

Example 39 is a system, comprising: a lowpass filter subsystem configured to lowpass filter a first channel coefficient of a set of channel coefficients with respect to time, the lowpass filtered first channel coefficient comprising a first group delay; and a prediction filter subsystem coupled to the lowpass filter subsystem and configured to filter a data sequence derived from the lowpass filtered first channel coefficient to generate a prediction value of the lowpass filtered first channel coefficient, wherein the prediction filter subsystem is adjusted to generate the prediction value comprising a second group delay that is less than the first group delay.

In Example 40, the subject matter of Example 39 can optionally include an adjustment subsystem configured to adjust the prediction filter subsystem based on a prediction filter algorithm.

In Example 41, the subject matter of any one of Examples 39-40 can optionally include that the data sequence comprises the lowpass filtered first channel coefficient.

In Example 42, the subject matter of Example 41 can optionally include a downsampler subsystem coupled to the lowpass filter subsystem and configured to downsample the lowpass filtered first channel coefficient to generate a time series of downsampled lowpass filtered first channel coefficients, and that the data sequence comprises values derived from the downsampled lowpass filtered first channel coefficient.

In Example 43, the subject matter of any one of Examples 39-42 can optionally include that the system is an on-chip system.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A device for mitigating a first group delay of a lowpass filter configured to lowpass filter a first channel coefficient of a set of channel coefficients with respect to time, the device comprising:
a prediction filter configured to filter a data sequence derived from the lowpass filtered first channel coefficient to generate a prediction value of the lowpass filtered first channel coefficient; and
an adjustment circuitry configured to adjust the prediction filter to generate the prediction value comprising a second group delay that is less than the first group delay.

2. The device of claim 1,
wherein the adjustment circuitry is configured to adjust the prediction filter based on a prediction filter algorithm.

3. The device of claim 2,
wherein the data sequence comprises the lowpass filtered first channel coefficient.

4. The device of claim 3, further comprising:
a downsampler coupled to the lowpass filter and configured to downsample the lowpass filtered first channel coefficient to generate a time series of downsampled lowpass filtered first channel coefficients,
wherein the data sequence comprises values derived from the downsampled lowpass filtered first channel coefficient.

5. The device of claim 4, further comprising:
a delay line coupled to the downsampler and configured to generate a first time pattern series by delaying the downsampled lowpass filtered first channel coefficient with respect to time,
wherein the data sequence comprises values derived from the first time pattern series.

6. The device of claim 5, further comprising:
an interpolation line coupled to the delay line and configured to generate a second time pattern series by interpolating values of the first time pattern series,
wherein the data sequence comprises the second time pattern series.

7. The device of claim 6,
wherein the interpolation line is configured to generate the second time pattern series at time samples between time samples of the first time pattern series.

8. The device of claim 6,
wherein the interpolation line is configured to interpolate between at least two contiguous time samples of the first time pattern series.

9. The device of claim 6,
wherein the interpolation line is configured to interpolate between multiple time samples of the first time pattern series.

10. The device of claim 6,
wherein the adjustment circuitry is configured to adjust the prediction filter based on lowpass filtered and delayed samples.

11. The device of claim 6,
wherein the adjustment circuitry is configured to adjust the prediction filter at time samples of the second time pattern series.

12. The device of claim 1,
wherein the prediction filter is configured to generate a compensation for a predetermined group delay of the lowpass filter.

13. The device of claim 1, further comprising:
a second prediction filter configured to filter a second data sequence derived from a lowpass filtered second channel coefficient to generate a second prediction value of the lowpass filtered second channel coefficient; and
a second adjustment circuitry configured to adjust the second prediction filter to generate the second prediction value comprising a fourth group delay that is less than a third group delay of the lowpass filtered second channel coefficient.

14. The device of claim 13,
wherein the prediction filter and the second prediction filter are configured to independently filter the first data sequence and the second data sequence, respectively.

15. A prediction system, comprising:
a downsampling subsystem configured to downsample a lowpass filtered first channel coefficient;
a delay line subsystem configured to generate a first time pattern series by delaying the downsampled lowpass filtered first channel coefficient with respect to time;
an interpolation line subsystem configured to generate a second time pattern series by interpolating values of the first time pattern series; and
a prediction filter subsystem configured to filter a data sequence derived from the lowpass filtered first channel coefficient and the second time pattern series to provide a prediction value of the lowpass filtered first channel coefficient.

16. The system of claim 15,
wherein the prediction filter subsystem is configured to generate the prediction value comprising a group delay that is less than a group delay of a lowpass filter circuit providing the lowpass filtered first channel coefficient.

17. The system of claim 15,
wherein the lowpass filter subsystem generates the lowpass filtered first channel coefficient as a first value of the data sequence, and
wherein the interpolation line subsystem is configured to generate the second time pattern series as further values of the data sequence.

18. A prediction circuit, comprising:
a downsampling circuit configured to downsample a lowpass filtered first channel coefficient;
a delay line circuit configured to generate a first time pattern series by delaying the downsampled lowpass filtered first channel coefficient with respect to time;
an interpolation line circuit configured to generate a second time pattern series by interpolating values of the first time pattern series; and
a prediction filter circuit configured to filter a data sequence derived from the lowpass filtered first channel coefficient and the second time pattern series to provide a prediction value of the lowpass filtered first channel coefficient.

19. The prediction circuit of claim 18,
wherein the prediction filter circuit is configured to generate the prediction value comprising a group delay that is less than a group delay of the lowpass filtered first channel coefficient.

20. The prediction circuit of claim 18, comprising:
an adjustment circuit configured to adjust the prediction filter circuit based on a prediction filter algorithm.

21. A method for mitigating a lowpass filter group delay, the lowpass filter group delay resulting from lowpass filtering a first channel coefficient with respect to time, the lowpass filtered first channel coefficient comprising a first group delay, the method comprising:
prediction filtering a data sequence derived from the lowpass filtered first channel coefficient to provide a prediction value of the lowpass filtered first channel coefficient; and
adjusting the prediction filtering to generate the prediction value comprising a second group delay that is less than the first group delay.

22. The method of claim 21, further comprising:
adjusting the prediction filtering based on a prediction filter algorithm.

23. The method of claim 21, further comprising:
downsampling the lowpass filtered first channel coefficient to generate a time series of downsampled lowpass filtered first channel coefficients,
wherein the data sequence comprises values derived from the downsampled lowpass filtered first channel coefficient.

24. The method of claim 23, further comprising:
delaying the downsampled lowpass filtered first channel coefficient with respect to time to generate a first time pattern series,
wherein the data sequence comprises values derived from the first time pattern series.

* * * * *